United States Patent
Huang et al.

(10) Patent No.: US 11,833,710 B2
(45) Date of Patent: Dec. 5, 2023

(54) METHOD FOR PRODUCING ULTRA-STABLE AND ENHANCED SOLID WOOD FLOORING FOR UNDER-FLOOR HEATING VIA SURFACE COMPRESSION TECHNIQUE

(71) Applicant: JIUSHENG WOOD CO., LTD, Huzhou (CN)

(72) Inventors: Rongfeng Huang, Huzhou (CN); Yanwei Wang, Huzhou (CN); Enjiu Zhang, Huzhou (CN); Kai Zhang, Huzhou (CN); Xinmin Qian, Huzhou (CN); Fanxu Kong, Huzhou (CN); Xiaoyu He, Huzhou (CN); Hailong Shao, Huzhou (CN); Longxiang Sun, Huzhou (CN)

(73) Assignee: JIUSHENG WOOD CO., LTD, Huzhou (CN)

( * ) Notice: Subject to any disclaimer, the term of this patent is extended or adjusted under 35 U.S.C. 154(b) by 85 days.

(21) Appl. No.: 17/776,237

(22) PCT Filed: Jul. 9, 2021

(86) PCT No.: PCT/CN2021/105443
§ 371 (c)(1),
(2) Date: May 12, 2022

(87) PCT Pub. No.: WO2022/246977
PCT Pub. Date: Dec. 1, 2022

(65) Prior Publication Data
US 2023/0127773 A1 Apr. 27, 2023

(30) Foreign Application Priority Data
May 25, 2021 (CN) .......................... 202110568981.X

(51) Int. Cl.
*B27K 5/00* (2006.01)
*B27K 1/00* (2006.01)
(Continued)

(52) U.S. Cl.
CPC .............. *B27K 5/0085* (2013.01); *B27K 1/00* (2013.01); *B27K 5/001* (2013.01); *B27K 5/007* (2013.01);
(Continued)

(58) Field of Classification Search
CPC .... B27K 5/001; B27K 5/007; B27K 2200/30; B27K 1/00; B27K 5/0085; B27M 1/02; B27M 3/04
See application file for complete search history.

(56) References Cited

FOREIGN PATENT DOCUMENTS

| CN | 101603623 | * | 12/2009 |
| CN | 102107446 | * | 6/2011 |

(Continued)

OTHER PUBLICATIONS

Huang Rong-Feng, et al., Density Profile and Dimensional Stability of Solid Wood Floor Substrates Treated with Light Compression and Pressurized Steam, China Wood Industry, 2019, pp. 6-10, vol. 33, No. 2.
(Continued)

*Primary Examiner* — Nathan T Leong
(74) *Attorney, Agent, or Firm* — Bayramoglu Law Offices LLC

(57) ABSTRACT

A method for producing an ultra-stable and enhanced solid wood flooring for under-floor heating via surface compression technique includes: subjecting, while subjecting a solid wood to surface compression and enhancement, the solid wood to primary stabilization treatment by controlling a temperature of a hot pressing plate to obtain a compressed enhanced solid wood; putting the compressed enhanced
(Continued)

solid wood into a heat treatment tank; and subjecting the compressed enhanced solid wood to secondary stabilization treatment by controlling a pressure and a temperature of steam or air in the heat treatment tank and a treatment time to obtain a finished product. The ultra-stable surface-compressed enhanced solid wood flooring produced by the method features high dimensional stability, low set-recovery after water absorption, and desired moisture and heat resistance.

4 Claims, 1 Drawing Sheet

(51) Int. Cl.
  *B27M 1/02* (2006.01)
  *B27M 3/04* (2006.01)
(52) U.S. Cl.
  CPC ............ *B27M 1/02* (2013.01); *B27M 3/04* (2013.01); *B27K 2200/30* (2013.01)

(56) References Cited

FOREIGN PATENT DOCUMENTS

| | | | |
|---|---|---|---|
| CN | 102107446 | A | 6/2011 |
| CN | 102303340 | A | 1/2012 |
| CN | 103009449 | A | 4/2013 |
| CN | 106217566 | A | 12/2016 |
| CN | 108582377 | A | 9/2018 |
| CN | 108789719 | * | 12/2018 |
| CN | 108943208 | A | 12/2018 |
| CN | 112454592 | A | 3/2021 |
| WO | WO2019006836 | * | 1/2019 |

OTHER PUBLICATIONS

GB/T 35913-2018, Technical requirements of solid wood flooring for ground with heating system, General Administration of Quality Supervision, Inspection and Quarantine of the People's Republic of China, Standardization Administration of China, 2018, pp. 1-8.

* cited by examiner

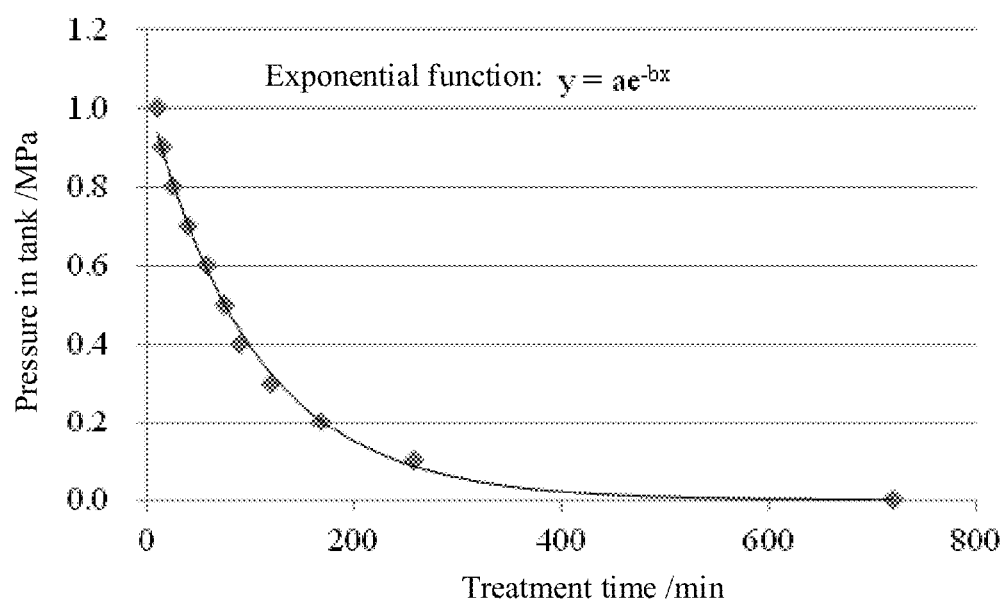

METHOD FOR PRODUCING ULTRA-STABLE AND ENHANCED SOLID WOOD FLOORING FOR UNDER-FLOOR HEATING VIA SURFACE COMPRESSION TECHNIQUE

CROSS REFERENCE TO THE RELATED APPLICATIONS

This application is the national phase entry of International Application No. PCT/CN2021/105443, filed on Jul. 9, 2021, which is based upon and claims priority to Chinese Patent Application No. 202110568981.X, filed on May 25, 2021, the entire contents of which are incorporated herein by reference.

TECHNICAL FIELD

The present disclosure relates to the technical field of floor production, and in particular to a method for producing an ultra-stable and enhanced solid wood flooring for under-floor heating via surface compression technique.

BACKGROUND

Solid wood flooring has high requirements on the hardness of a solid wood. Finished solid wood flooring needs to meet the paint film hardness specified by the Chinese national standard. For example, the first-class solid wood flooring needs to have a paint film hardness of greater than H, and the superior floor needs to have a paint film hardness of greater than 2H. To meet these requirements, the floor substrates must have a density of at least 0.60 g/cm$^3$ and 0.65 cm$^3$, respectively. At present, the average density of various floor substrates on the market reaches 0.60-0.70 g/cm$^3$. However, the variability of wood is large, and due to the differences in origin, variety, individual and acquisition location, the density difference reaches 0.20 g/cm$^3$ or more. As a result, the finished floor produced with the substrate of this density range can hardly reach the specified paint film hardness due to the low density of the raw material at some location.

In addition to the requirements for surface hardness, the solid wood flooring for under-floor heating must also meet the requirements of heat and moisture-induced dimensional stability specified by the Chinese national standard. Specifically, Chinese national standard GBT 35913-2018 *"Technical requirements of solid wood flooring for ground with heating system"* promulgated and implemented in 2018 proposes the high requirements for the heat and moisture-induced dimensional change rates of the flooring for under-floor heating.

Compression is an effective method to increase the density and hardness of wood. In the traditional overall compression method, the improvement of wood properties mainly depends on the high compression ratio, but there are problems of large loss of wood volume and high cost in the treatment process, making it hard for commercial application. Surface compression with heat-moisture treatment can improve the surface hardness of wood at a low compression ratio. For general floor substrates, a compression rate of about 15% can achieve a surface density of 0.70 g/cm$^3$ or more. However, the compression method faces a resilience problem, namely swelling in the thickness direction of the floor after compression.

At present, the wood substrate of the solid wood flooring for under-floor heating is subjected to high-temperature heat treatment or carbonization treatment under normal pressure so as to improve the dimensional stability of the wood substrate. However, the wood substrate treated by this method can usually only reach the benchmark value stipulated by an international standard. In actual use, there are large gaps in the length and width directions of the floors. To reduce the gaps between the floors, the commercially available heating floor adopts a method of locking the floor, and the enterprise without the patent of floor locking method is required to bear the patent royalties of the floor locking method.

Therefore, it is necessary to simultaneously solve the resilience problem of the wood substrate, namely the thickness swelling of the wood substrate and the dimensional changes in the length and width directions of the wood substrate on the premise of meeting the user's requirements. It is of great significance for reducing the cost of stabilization treatment of solid wood floorings and making solid wood floorings widely used for under-floor heating.

SUMMARY

An objective of the present disclosure is to provide a method for producing an ultra-stable and enhanced solid wood flooring for under-floor heating via surface compression technique. The ultra-stable surface-compressed enhanced solid wood flooring produced by the method of the present disclosure features high dimensional stability, low set-recovery after water absorption, and desired moisture and heat resistance.

The present disclosure adopts the following technical solution: a method for producing an ultra-stable and enhanced solid wood flooring for under-floor heating via surface compression technique. The method includes: subjecting, while subjecting a solid wood to surface compression and enhancement, the solid wood to primary stabilization treatment by controlling a temperature of a hot pressing plate, to obtain a compressed enhanced solid wood; putting the compressed enhanced solid wood into a heat treatment tank; and subjecting the compressed enhanced solid wood to secondary stabilization treatment by controlling a pressure and temperature of steam or a mixture of steam and air in the heat treatment tank and a treatment time to obtain a finished product.

In the above method for producing an ultra-stable and enhanced solid wood flooring for under-floor heating via surface compression technique, the primary stabilization treatment includes: spraying, dipping or immersing the solid wood with water until a surface water volume of the solid wood increases by 0.025-0.200 g/cm$^2$; putting the solid wood into the hot pressing plate at 100-200° C., and quickly closing the hot pressing plate in no more than 1 min to ensure a pressure of less than 1 MPa in a closed state; heating at 130-160° C. for 10-60 s; compressing the solid wood at 3-8 MPa to a set thickness of 12-20 mm and a surface density of 0.70 g/cm$^3$ or more; holding for 3-5 min; decreasing the pressure of the hot pressing plate to 0.8-1.2 MPa, and decreasing the temperature of the hot pressing plate to 60° C. or below; and taking the solid wood out, thereby completing the primary stabilization treatment.

In the above method for producing an ultra-stable and enhanced solid wood flooring for under-floor heating via surface compression technique, the primary stabilization treatment specifically includes: spraying, dipping or immersing the solid wood with water until the surface water volume of the solid wood increases by 0.05-0.10 g/cm$^2$; putting the solid wood into the hot pressing plate at 145° C., and quickly closing the hot pressing plate in no more than 1 min to ensure a pressure of less than 1 MPa in a closed state; heating at 145-160° C. for 15-30 s; compressing the solid wood at 5-6 MPa to a set thickness of 15-18 mm and a surface density of 0.70 g/cm³ or more; holding for 3-5 min; decreasing the pressure of the hot pressing plate to 1 MPa, and decreasing the temperature of the hot pressing plate to 60° C. or below; and taking the solid wood out, thereby completing the primary stabilization treatment.

In the above method for producing an ultra-stable and enhanced solid wood flooring for under-floor heating via surface compression technique, the secondary stabilization treatment includes: stacking the compressed enhanced solid wood obtained through the primary stabilization treatment; putting the compressed enhanced solid wood into the heat treatment tank by clamping the compressed enhanced solid wood with a pressure of 0.5-1.5 MPa or pressing the compressed enhanced solid wood with a counterweight; heating up to 160-200° C.; introducing the steam or the mixture of steam and air into the heat treatment tank to increase a pressure in the heat treatment tank to 0.05-0.10 MPa; holding for 0.5-1.0 h; and adjusting a relationship between the pressure in the heat treatment tank and the treatment time according to an exponential function $y=ae^{-bx}$;

where, y denotes the pressure in the heat treatment tank, and y ranges from a normal pressure to 1.5 MPa; x denotes the treatment time, and x is 2-720 min; and a and b are constants, a being 0.9-1.2, and b being 0.01-0.03; and stopping heating after adjustment is completed; decreasing the pressure at a rate of 0.012 MPa/min or below by discharging the steam; decreasing the temperature to 80° C. or below by cold water; opening the heat treatment tank; and taking, when the temperature in the heat treatment tank is decreased to 60° C. or below, the solid wood out to obtain the finished product, thereby completing the secondary stabilization treatment.

In the above method for producing an ultra-stable and enhanced solid wood flooring for under-floor heating via surface compression technique, the secondary stabilization treatment includes: stacking the compressed enhanced solid wood obtained through the primary stabilization treatment; putting the compressed enhanced solid wood into the heat treatment tank by clamping the compressed enhanced solid wood with a pressure of 1 MPa or pressing the compressed enhanced solid wood with a counterweight; heating up to 180° C.; introducing the steam or the mixture of steam and air into the heat treatment tank to increase the pressure in the heat treatment tank to 0.05-0.10 MPa; holding for 0.5-0.8 h; and adjusting the relationship between the pressure in the heat treatment tank and the treatment time according to the exponential function $y=ae^{-bx}$;

where, y denotes the pressure in the heat treatment tank, and y ranges from the normal pressure to 1.5 MPa; x denotes the treatment time, and x is 2-720 min; and a and b are constants, a being 0.9-1.2, and b being 0.01-0.03; and stopping heating after adjustment is completed; decreasing the pressure at the rate of 0.012 MPa/min or below by discharging the steam; decreasing the temperature to 80° C. or below by cold water; opening the heat treatment tank; and taking, when the temperature in the heat treatment tank is decreased to 60° C. or below, the solid wood out to obtain the finished product, thereby completing the secondary stabilization treatment.

In the above method for producing an ultra-stable and enhanced solid wood flooring for under-floor heating via surface compression technique, the solid wood has a density of less than 0.6 g/cm³, a thickness of 15-50 mm, and a moisture content of 15% or below.

Compared with the prior art, while subjecting the solid wood to the surface compression and enhancement, the present disclosure subjects the solid wood to the primary stabilization treatment by controlling the temperature of the hot pressing plate to obtain a compressed enhanced solid wood. After treatment, the density of the surface of the compressed enhanced solid wood and a surface layer within 1-5 mm from the surface reaches 0.6-1.0 g/cm³, and the dimensional stability is improved by more than 30% in the state of immersion in water. Then, the compressed enhanced solid wood is put into the heat treatment tank, and the compressed enhanced solid wood is subjected to the secondary stabilization treatment by controlling the pressure and temperature of the steam or air in the heat treatment tank and the treatment time. After the secondary stabilization treatment, the dimensional stability of the compressed enhanced solid wood is improved by more than 90%. In addition, the set-recovery after water absorption in the thickness direction is reduced to 0, that is, there is no resilience, and the heat and moisture-induced dimensional change rates are reduced to 40% or below specified by the Chinese national standard. Furthermore, the present disclosure realizes the surface compression and enhancement of the wood through the heat-moisture treatment, which avoids the need for cooking treatment, reduces the treatment procedure of the compression process, and effectively reduces the treatment cost. Besides, the dimensional stability of the ultra-stable surface-compressed enhanced solid wood flooring for under-floor heating in the present disclosure is at least 85% more than that specified by the Chinese national standard.

BRIEF DESCRIPTION OF THE DRAWINGS

FIGURE shows a relationship between a pressure in a heat treatment tank and a treatment time during secondary stabilization treatment.

DETAILED DESCRIPTION OF THE EMBODIMENTS

The present disclosure is further described below with reference to the drawings and examples, but the present disclosure is not limited thereto.

Example 1: A method for producing an ultra-stable and enhanced solid wood flooring for under-floor heating via surface compression technique includes the following steps. A flat solid wood is selected, which has a density of 0.4 g/cm³, a moisture content of 15% or below and a thickness of 30 mm. The solid wood is sprayed, dipped or immersed with water until a surface water volume of the solid wood increases by 0.1 g/cm². The solid wood is put into a hot pressing plate at 150° C., and the hot pressing plate is quickly closed in no more than 1 min to ensure a pressure of less than 1 MPa in a closed state. The hot pressing plate is heated at 150° C. for 50 s, and the solid wood is compressed at 4 MPa to a set thickness of 20 mm and a surface density of 0.85 g/cm³. The pressure is held for 5 min. The pressure of the hot pressing plate is decreased to 1 MPa, and the temperature of the hot pressing plate is decreased to 60° C. or below. The solid wood is taken out, thereby completing primary stabilization treatment.

The compressed enhanced solid wood obtained through the primary stabilization treatment is stacked, and put into a heat treatment tank by clamping the compressed enhanced solid wood with a pressure of 1 MPa or pressing the compressed enhanced solid wood with a counterweight. The heat treatment tank is heated up to 170° C. Then steam or a mixture of steam and air is introduced into the heat treatment tank to increase a pressure in the heat treatment tank to 0.06 MPa, and the pressure is held for 0.6 h. As shown in FIGURE, a relationship between the pressure in the heat treatment tank and the treatment time is adjusted according to an exponential function $y=ae^{-bx}$.

In the formula, y denotes the pressure in the heat treatment tank, and y ranges from a normal pressure to 1.5 MPa; x denotes the treatment time, and x is 2-720 min; and a and b are constants, a being 0.9-1.2, and b being 0.01-0.03.

The heating is stopped after adjustment is completed. The pressure is decreased at a rate of 0.012 MPa/min or below by discharging the steam, and the temperature is decreased by cold water until 80° C. or below. The heat treatment tank is opened, and when the temperature in the heat treatment tank is decreased to 60° C. or below, the solid wood is taken out to obtain a finished product, thereby completing secondary stabilization treatment.

Example 2: A method for producing an ultra-stable and enhanced solid wood flooring for under-floor heating via surface compression technique includes the following steps. A flat solid wood is selected, which has a density of 0.4 g/cm³, a moisture content of 10% and a thickness of 30 mm. The solid wood is sprayed, dipped or immersed with water until a surface water volume of the solid wood increases by 0.03 g/cm². The solid wood is put into a hot pressing plate at 160° C., and the hot pressing plate is quickly closed in no more than 1 min to ensure a pressure of less than 1 MPa in a closed state. The hot pressing plate is heated at 160° C. for 40 s, and the solid wood is compressed at 5 MPa to a set thickness of 20 mm and a surface density of 0.95 g/cm³. The pressure is held for 5 min. The pressure of the hot pressing plate is decreased to 1 MPa, and the temperature of the hot pressing plate is decreased to 60° C. or below. The solid wood is taken out, thereby completing primary stabilization treatment.

The compressed enhanced solid wood obtained through the primary stabilization treatment is stacked, and put into a heat treatment tank by clamping the compressed enhanced solid wood with a pressure of 1 MPa or pressing the compressed enhanced solid wood with a counterweight. The heat treatment tank is heated up to 180° C. Then steam is introduced into the heat treatment tank to increase a pressure in the heat treatment tank to 0.1 MPa, and the pressure is held for 0.8 h. A relationship between the pressure in the heat treatment tank and the treatment time is adjusted according to an exponential function $y=ae^{-bx}$.

In the formula, y denotes the pressure in the heat treatment tank, and y ranges from a normal pressure to 1.5 MPa; x denotes the treatment time, and x is 2-720 min; and a and b are constants, a being 0.9-1.2, and b being 0.01-0.03.

The heating is stopped after adjustment is completed. The pressure is decreased at a rate of 0.012 MPa/min or below by discharging the steam, and the temperature is decreased by cold water until 80° C. or below. The heat treatment tank is opened, and when the temperature in the heat treatment tank is decreased to 60° C. or below, the solid wood is taken out to obtain a finished product, thereby completing secondary stabilization treatment.

Example 3: A method for producing an ultra-stable and enhanced solid wood flooring for under-floor heating via surface compression technique includes the following steps. A flat solid wood is selected, which has a density of 0.4 g/cm³, a moisture content of 10% and a thickness of 30 mm. The solid wood is sprayed, dipped or immersed with water until a surface water volume of the solid wood increases by 0.05 g/cm². The solid wood is put into a hot pressing plate at 145° C., and the hot pressing plate is quickly closed in no more than 1 min to ensure a pressure of less than 1 MPa in a closed state. The hot pressing plate is heated at 145° C. for 40 s, and the solid wood is compressed at 5 MPa to a set thickness of 20 mm and a surface density of 0.90 g/cm³. The pressure is held for 4 min. The pressure of the hot pressing plate is decreased to 1 MPa, and the temperature of the hot pressing plate is decreased to 60° C. or below. The solid wood is taken out, thereby completing primary stabilization treatment.

The compressed enhanced solid wood obtained through the primary stabilization treatment is stacked, and put into a heat treatment tank by clamping the compressed enhanced solid wood with a pressure of 1 MPa or pressing the compressed enhanced solid wood with a counterweight. The heat treatment tank is heated up to 180° C. Then a mixture of steam and air is introduced into the heat treatment tank to increase a pressure in the heat treatment tank to 0.1 MPa, and the pressure is held for 0.6 h. A relationship between the pressure in the heat treatment tank and the treatment time is adjusted according to an exponential function $y=ae^{-bx}$.

In the formula, y denotes the pressure in the heat treatment tank, and y ranges from a normal pressure to 1.5 MPa; x denotes the treatment time, and x is 2-720 min; and a and b are constants, a being 0.9-1.2, and b being 0.01-0.03.

The heating is stopped after adjustment is completed. The pressure is decreased at a rate of 0.012 MPa/min or below by discharging the steam, and the temperature is decreased by cold water until 80° C. or below. The heat treatment tank is opened, and when the temperature in the heat treatment tank is decreased to 60° C. or below, the solid wood is taken out to obtain a finished product, thereby completing secondary stabilization treatment.

Comparative Example: Commercially Available Surface-Compressed Solid Wood Flooring for Under-Floor Heating The finished products prepared in Examples 1 to 3, the semi-finished products prepared through the primary stabilization treatment, and the commercially available surface-compressed solid wood flooring for under-floor heating in the comparative example were tested. The dimensional stability test was carried out according to the method specified in the Chinese national standard GBT 35913-2018 *"Technical requirements of solid wood flooring for ground with heating system"*.

The set-recovery of the compressed floor or substrate after moisture absorption was measured as follows: immerse the sample in water for 48 h, vacuumize for 1 h under the water immersion condition, continue to immerse for 6 h, and measure the thickness of the sample; then take the sample out and air-dry in a room for 2 days; oven-dry at 60° C. for 24 h, and dry at (103±2)° C. until a zero moisture content; and measure the thickness. The set-recovery was calculated as follows:

$$RS = \frac{dr - dc}{d0 - dc} \times 100\%$$

In the formula: RS (%) denotes the set-recovery; d0 (mm) denotes an oven-dry thickness before hot pressing; dc (mm) denotes an oven-dry thickness after hot pressing; dr (mm) denotes an oven-dry thickness after water absorption.

The test results of dimensional stability and set-recovery are shown in Table 1 (where "none" means no statistical calculation is performed).

TABLE 1

Test results of dimensional stability and set-recovery of examples and comparative example

|  | Heat resistance (width) | | Moisture resistance (width) | | |
| --- | --- | --- | --- | --- | --- |
|  | Improved dimensional stability | Dimensional change rate | Improved dimensional stability | Dimensional change rate | Set-recovery after water absorption |
| Example 1 | 89.3% | 0.16% | 90.0% | 0.08% | 0 |
| Example 2 | 92.0% | 0.12% | 92.5% | 0.06% | 0 |
| Example 3 | 88.0% | 0.18% | 87.5% | 0.10% | 0 |
| Comparative Example | — | 1.50% | — | 0.80% | None |
| Compressed enhanced solid wood obtained after primary stabilization treatment in Example 1 | 19.3% | 1.21% | 16.3% | 0.67% | 78% |
| Compressed enhanced solid wood obtained after primary stabilization treatment in Example 2 | 21.3% | 1.18% | 18.8% | 0.65% | 69% |
| Compressed enhanced solid wood obtained after primary stabilization treatment in Example 3 | 16.0% | 1.26% | 12.5% | 0.70% | 81% |

Table 1 shows that, while subjecting the solid wood to surface compression and enhancement, the present disclosure subjects the solid wood to the primary stabilization treatment by controlling the temperature of the hot pressing plate. After the primary stabilization treatment, the dimensional stability of the compressed enhanced solid wood was improved by more than 30%. After the secondary stabilization treatment, the dimensional stability of the finished product was improved by 90%, which was much higher than that of the comparative example. Table 1 also shows that the moisture and heat-induced dimensional change rates of the compressed solid wood obtained by the present disclosure are at least 75% lower than those specified by the Chinese national standard, which stipulates that the moisture-induced dimensional change rate should be less than 0.8% and the heat-induced dimensional change rate should be less than 1.5%. In addition, the dimensional stability is improved by more than 90%, and the set-recovery after compression is reduced to 0, that is, there is no resilience after compression. The decreases in the moisture and heat-induced dimensional change rates in the present disclosure are superior to those in the comparative example. Therefore, the ultra-stable surface-compressed enhanced solid wood flooring produced by the method of the present disclosure features high dimensional stability, low set-recovery after water absorption, and desired moisture and heat resistance.

What is claimed is:

1. A method for producing an ultra-stable and enhanced solid wood flooring for under-floor heating via surface compression technique, comprising:
   subjecting, while subjecting a solid wood to surface compression and enhancement, the solid wood to primary stabilization treatment by controlling a temperature of a hot pressing plate, to obtain a compressed enhanced solid wood; putting the compressed enhanced solid wood into a heat treatment tank; and subjecting the compressed enhanced solid wood to secondary stabilization treatment by controlling a pressure and temperature of steam or a mixture of steam and air in the heat treatment tank and a treatment time to obtain a finished product;
   wherein the primary stabilization treatment comprises: spraying, dipping or immersing the solid wood with water until a surface water volume of the solid wood increases by 0.025-0.200 g/cm$^2$; putting the solid wood into the hot pressing plate at 100-200° C., and quickly closing the hot pressing plate in no more than 1 min to ensure a pressure of less than 1 MPa in a closed state; heating the hot pressing plate at 130-160° C. for 10-60 s; compressing the solid wood at 3-8 MPa to a set thickness of 12-20 mm and a surface density of 0.70 g/cm$^3$ or more; holding the thickness under 3-8 MPa for 3-5 min; decreasing the pressure of the hot pressing plate to 0.8-1.2 MPa, and decreasing the temperature of the hot pressing plate to 60° C. or below and taking the solid wood out, thereby completing the primary stabilization treatment;
   wherein the secondary stabilization treatment comprises: stacking the compressed enhanced solid wood obtained through the primary stabilization treatment; putting the compressed enhanced solid wood into the heat treatment tank by clamping the compressed enhanced solid wood with a pressure of 0.5-1.5 MPa or pressing the compressed enhanced solid wood with a counterweight; heating the heat treatment tank up to 160-200° C.; introducing the steam or the mixture of steam and air into the heat treatment tank to increase a pressure in the heat treatment tank to 0.05-0.10 MPa; holding the temperature and the pressure of the heat treatment tank for 0.5-1.0 h; and adjusting a relationship between the pressure in the heat treatment tank and the treatment time according to an exponential function $y=ae^{-bx}$;
   wherein, y denotes the pressure in the heat treatment tank, and y ranges from a normal pressure to 1.5 MPa; x denotes the treatment time, and x is 2-720 min; and a and b are constants, a being 0.9-1.2, and b being 0.01-0.03; and
   stopping heating after adjustment is completed; decreasing the pressure at a rate of 0.012 MPa/min or below by discharging the steam; decreasing the temperature to 80° C. or below by cold water; opening the heat treatment tank; and taking, when the temperature in the heat treatment tank is decreased to 60° C. or below, the solid wood out to obtain the finished product, thereby completing the secondary stabilization treatment.

2. The method for producing the ultra-stable and enhanced solid wood flooring for under-floor heating via surface compression technique according to claim 1, wherein the primary stabilization treatment comprises: spraying, dipping or immersing the solid wood with water until the surface water volume of the solid wood increases by 0.05-0.10 g/cm$^2$; putting the solid wood into the hot pressing plate at 145° C., and quickly closing the hot pressing plate in no more than 1 min to ensure a pressure of less than 1 MPa in a closed state; heating the hot pressing plate at 145-160° C. for 15-30 s; compressing the solid wood at 5-6 MPa to a set thickness of 15-18 mm and the surface density of 0.70 g/cm$^3$ or more; holding the thickness under 5-6 MPa for 3-5 min; decreasing the pressure of the hot pressing plate to 1 MPa, and decreasing the temperature of the hot pressing plate to 60° C. or below; and taking the solid wood out, thereby completing the primary stabilization treatment.

3. The method for producing the ultra-stable and enhanced solid wood flooring for under-floor heating via surface compression technique according to claim 1, wherein the secondary stabilization treatment comprises: stacking the compressed enhanced solid wood obtained through the primary stabilization treatment; putting the compressed enhanced solid wood into the heat treatment tank by clamping the compressed enhanced solid wood with a pressure of 1 MPa or pressing the compressed enhanced solid wood with the counterweight; heating the heat treatment tank up to 180° C.; introducing the steam or the mixture of steam and air into the heat treatment tank to increase the pressure in the heat treatment tank to 0.05-0.10 MPa; holding the temperature and the pressure of the heat treatment tank for 0.5-0.8 h; and adjusting the relationship between the pressure in the heat treatment tank and the treatment time according to the exponential function $y=ae^{-bx}$;

wherein, y denotes the pressure in the heat treatment tank, and y ranges from the normal pressure to 1.5 MPa; x denotes the treatment time, and x is 2-720 min; and a and b are constants, a being 0.9-1.2, and b being 0.01-0.03; and stopping heating after the adjustment is completed; decreasing the pressure at the rate of 0.012 MPa/min or below by discharging the steam; decreasing the temperature to 80° C. or below by cold water; opening the heat treatment tank; and taking, when the temperature in the heat treatment tank is decreased to 60° C. or below, the solid wood out to obtain the finished product, thereby completing the secondary stabilization treatment.

4. The method for producing the ultra-stable and enhanced solid wood flooring for under-floor heating via surface compression technique according to claim 1, wherein the solid wood has a density of less than 0.6 g/cm$^3$, a thickness of 15-50 mm, and a moisture content of 15% or below.

\* \* \* \* \*